3,193,532
PRODUCTION OF HIGH MOLECULAR WEIGHT POLYMERS OF FORMALDEHYDE
Henri Sidi, Paramus, N.J., assignor, by mesne assignments, to Tenneco Chemicals, Inc., a corporation of Delaware
No Drawing. Filed July 25, 1962, Ser. No. 212,483
11 Claims. (Cl. 260—67)

This invention relates to a process for the production of high molecular weight polymers of formaldehyde. More particularly it relates to a process for the production of formaldehyde polymers having a high degree of thermal stability.

This is a continuation-in-part of copending patent application Serial No. 133,783, which was filed on August 25, 1961.

It is well known that formaldehyde can be polymerized to form high molecular weight polyoxymethylenes from which tough, flexible films and other articles can be made. Since these polymers degrade rapidly when they are subjected to elevated temperatures, it is generally desirable that their thermal stability be increased. It has been proposed that polyoxymethylenes be stabilized by treatment with anhydrides of carboxylic acids, hydrazines, substituted alkylene diamines, secondary or tertiary monomeric aromatic amines, ureas, thioureas, phenols, and the like. In each case the stabilized polymer has been prepared by polymerizing formaldehyde to form high molecular weight polyoxymethylene, isolating the polymer so formed, and thereafter treating the polymer with the stabilizing agent. To obtain a product having good thermal stability, it has often been necessary to dissolve the polyoxymethylene in a solvent or in the stabilizing agent by heating it at elevated temperatures and/or at superatmospheric pressures before effecting the stabilization reaction. These previously-employed stabilization procedures are usually inefficient and time-consuming and may result in some degradation of the polymer.

In copending patent application Serial No. 133,783, which was filed on August 25, 1961, there are disclosed and claimed unified processes wherein monomeric formaldehyde is converted to stabilized polyoxymethylenes without the isolation and purification of an intermediate unstabilized product. In these procedures anhydrous monomeric formaldehyde is introduced into a reactor that contains an alkylene dicarboxylate and allowed to polymerize to high molecular weight polyoxymethylene. The resulting suspension of polyoxymethylene in the alkylidene diester is then heated to form a stabilized product.

It has now been found that when a polyvalent metal salt of an alkanoic acid is used as the polymerization initiator in the aforementioned unified processes for the preparation of stabilized polyoxymethylene valuable improvements result. When other well-known polymerization initiators are used in these processes, it is necessary to carry out the polymerization reaction at a temperature below approximately −10° C. in order to obtain in good yield a product having a molecular weight of at least 20,000. When a polyvalent metal salt of an alkanoic acid is used as the polymerization initiator, the polymerization may be accomplished at ambient temperatures without adversely affecting the yield of the product or its properties. When the polymerization is effected at ambient temperatures rather than at temperatures below −10° C., simpler and less expensive equipment may be used, and processing costs are appreciably reduced. In addition the compounds described herein as being initiators for the polymerization of formaldehyde in an alkylidene diester reaction medium have been found to be less sensitive that other initiators to impurities in the reaction medium and to be capable of producing polymer at a high rate even though very small amounts of the initiator are used.

As used herein, the term "high molecular weight polyoxymethylene" or the term "high molecular weight polymers of formaldehyde" both relate to polymers having recurring oxymethylene (—$CH_2O$—) units and having average molecular weights between approximately 10,000 and 200,000 and preferably between 15,000 and 100,000. Particularly preferred are the formaldehyde polymers having average molecular weights between approximately 20,000 and 60,000. The unstabilized polyoxymethylenes are those having the formula $HO(CH_2O)_nR$, wherein R represents a hydrogen atom or an alkyl, cycloalkyl, aryl, or acyl group. In the stabilized materials prepared in accordance with this invention, substantially all of the hydroxyl groups have been converted to ester groups.

The formaldehyde monomer that is used as the starting material in this process may be derived from any convenient source. For example, it may be obtained by the pyrolysis of paraformaldehyde, trioxane, α-polyoxymethylene, or a hemiformal, such as cyclohexanol hemiformal. If the desired tough, high molecular weight product is to be obtained, it is necessary that the formaldehyde monomer be substantially anhydrous, that is, that it contain less than 0.5% and preferably less than 0.1% by weight of water.

The alkylene dicarboxylate that may be used in the practice of this invention have the formula

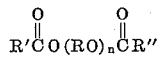

wherein R represents $CH_2$ or $CH(CH_3)$, R′ and R″ each represents the residue of an ethylenically saturated monocarboxylic acid, and $n$ represents a number in the range of 1 to 3. The groups represented by R′ and R″, which may be the same or different groups, include alkyl groups containing from 1 to 18 carbon atoms, cycloalkyl groups, and aryl groups. Illustrative of these groups are methyl, ethyl, butyl, hexyl, octyl, 2-ethylhexyl, decyl, dodecyl, hexadecyl, octadecyl, cyclopentyl, cyclohexyl, phenyl, chlorophenyl, and hydroxyphenyl groups. The preferred diesters are those in which R represents a methylene group and R′ and R″ each represents an alkyl group containing from 1 to 3 carbon atoms, for example, methylene diacetate, methylene dipropionate, methylene dibutyrate, methylene acetate propionate, the low molecular weight polymeric analogs of these diesters, and mixtures thereof. Particularly preferred are methylene diacetate and mixtures containing approximately 50% to 90% of methylene diacetate and approximately 10% to 50% of its dimeric and trimeric analogs.

The alkylene dicarboxylate may be prepared by any convenient procedure. For example, approximately equimolar amounts of paraformaldehyde and the appropriate monocarboxylic acid anhydride or a mixture of such anhydrides may be reacted in the presence of an acidic catalyst, for example, zinc chloride, sulfuric acid, or phosphoric acid, and the product isolated by fractional distillation. It is often advantageous to distill off a portion of the diester prior to its use in the present process to insure the absence of monocarboxylic acids which may inhibit the polymerization.

The use of the alkylene dicarboxylate is particularly valuable in this process for the production of stabilized high molecular weight polyoxymethylene since at the temperatures at which the polymerization takes place they are liquid, they are inert to formaldehyde and to the polymerization initiator, and they do not dissolve the polyoxymethylene formed, whereas at the elevated temperatures at which the stabilization is carried out they readily dissolve the high molecular weight polyoxymethylene and react with it to form products that have excellent thermal stability.

The amount of the alkyline dicarboxylate present during the polymerization step is not critical but may be within the range of approximately 1 to 1000 parts by weight per part by weight of anhydrous formaldehyde. In most cases approximately 1 to 100 parts and preferably 1 to 10 parts of the diester is used for each part of formaldehyde.

The polymerization of formaldehyde in accordance with the present invention is effected in the presence of approximately 0.00001 part to 0.05 part and preferably 0.0001 part to 0.005 part by weight per part by weight of formaldehyde of a polymerization initiator which is a polyvalent metal salt of an alkanoic acid containing from 4 to 18 carbon atoms and preferably from 6 to 10 carbon atoms. Salts of a wide variety of polyvalent metals may be used in the practice of the present invention. These include, for example, salts of iron, cobalt, nickel, manganese, titanium, zirconium, hafnium, tin, cerium, lead, aluminum, copper, magnesium, calcium, zinc, strontium, cadmium, and barium. The metal salt used as polymerization initiator is one that is soluble in the alkylene dicarboxylate which is used as the reaction medium. In most cases polyvalent metal salts of alkanoic acids containing from 6 to 10 carbon atoms are used since these salts are readily soluble in methylene diacetate. Illustrative of the salts that may be used to initiate the polymerization of formaldehyde are the following: iron hexanoate, iron 2-ethylhexanoate, iron decanoate, cobalt octanoate, cobalt heptanoate, nickel dodecanoate, manganese hexanoate, manganese 2-ethylhexanoate, manganese decanoate, titanium octanoate, zirconium hexanoate, zirconium heptanoate, zirconium decanoate, stannous hexanoate, stannous omtanoate, cerium octanoate, lead heptanoate, lead 2-ethylhexanoate, aluminum hexanoate, aluminum 2-ethylhexanoate, aluminum octadecanoate, copper butyrate, copper dodecanoate, copper octadecanoate, manganese butyrate, manganese heptanoate, calcium hexanoate, calcium decanoate, zinc butyrate, zinc hexanoate, strontium decanoate, strontium dodecanoate, cadmium hexanoate, cadmium 2-ethylhexanoate, barium hexanoate, barium decanoate, and the like. Particularly preferred for use as formaldehyde polymerization initiators are the polyvalent metal salts of octanoic acid and 2-ethylhexanoic acid. A single polyvalent metal salt or a mixture of these salts may be used as formaldehyde polymerization initiators. Alternatively, they may be used in combination with other formaldehyde polymerization initiators, such as aliphatic amines and polyamines. The polyvalent metal salts may be added to the reaction medium as such; preferably, however, they are added as solutions of the salt in a hydrocarbon solvent, such as benzene, toluene, hexane, mineral spirits, or naphtha.

The polymerization of formaldehyde to high molecular weight polyoxymethylene may be carried out in any convenient manner. For example, anhydrous monomeric formaldehyde may be introduced into a reactor containing the alkylidene diester and the polymerization initiator. Alternatively, formaldehyde may be introduced into a reactor containing the alkylene dicarboxylate while at the same time the initiator is added at such a rate that the temperature of the reaction mixture is maintained within the desired range. The polymerization of formaldehyde to high molecular weight polyoxymethylene may be carried out as either a batchwise process or a continuous process.

The anhydrous monomeric formaldehyde is ordinarily introduced into the reactor through a gas inlet tube opening above the surface of the alkylene dicarboxylate so as to avoid plugging due to formation of polymer within the tube. The reaction mixture is stirred vigorously throughout the polymerization step.

In the practice of this invention the polymerization of formaldehyde to high molecular weight polyoxymethylene is effected at a temperature between approximately 10° C. and 80° C. and preferably between 20° C. and 60° C. It is particularly preferred to effect the polymerization of formaldehyde at approximately 25° C. to 45° C. Temperatures below 0° C. may also be used for the polymerization, but they do not provide any particular advantage and they are difficult and costly to maintain. While superatmospheric and subatmospheric pressures may be employed, the polymerization of formaldehyde is generally carried out under atmospheric pressure.

The formation of tough, high molecular weight polyoxymethylene is best effected under non-oxidizing conditions. A convenient way of obtaining such conditions involves sweeping the reactor with a dry inert gas, such as nitrogen, and then polymerizing the formaldehyde under a blanket of the inert gas. In addition an antioxidant may be present during the reaction and/or may be added to the product to reduce oxidative effects. Among the antioxidants that are useful for this purpose are phenothiazine, 2-mercaptobenzimidazole, diphenylamine, phenyl-$\alpha$-naphthylamine, bis ($\beta$-naphthylamine)-p-phenylenediamine, 4,4'-butylidene bis (3-methyl-6-tertiary butylphenol), and 5-ethyl-10,10-diphenylphenazasiline. The amount of antioxidant used is generally about 0.01% to about 1% based on the weight of the formaldehyde.

In those cases in which it is desirable to control the molecular weight of the product, a small amount of a chain transfer agent may be added to the reaction mixture before or during the polymerization step. Suitable chain transfer agents include water; aliphatic alcohols, such as methanol and cyclohexanol; aliphatic acids and acid anhydrides, such as formic acid, acetic acid, butyric acid, acetic anhydride, and propionic anhydride; aromatic acids, such as benzoic acid and toluic acid; and esters, such as methyl acetate, methyl propionate, ethyl formate, and ethyl acetate.

The polymerization of formaldehyde takes place rapidly and is generally considered to be complete as soon as all of the monomeric formaldehyde has been added. The reaction mixture may, however, be maintained at the polymerization temperature for a period ranging from several minutes to an hour or more before the stabilization step is begun.

Upon completion of the polymerization step, the reaction mixture, which comprises a suspension of high molecular weight unstabilized polyoxymethylene in the alkylene dicarboxylate, is heated with stirring to a temperature at which the alkylidene diester will react with the terminal hydroxyl groups of the unstabilized polyoxymethylene and maintained at that temperature until esterification of the hydroxyl groups is complete. While temperatures as low as approximately 100° C. may be used, with esterification reaction is preferably carried out at a temperature in the range of approximately 140° C. to 200° C. If desired, somewhat higher temperatures may be used. It is particularly preferred that the esterification reaction take place at a temperature in the range of approximately 150° C. to 180° C. At temperatures in the preferred range, a reaction period of approximately 5 minutes to 3 hours is generally required for the stabilization.

The reaction between the polyoxymethylene and the alkylene dicarboxylate is preferably carried out in the presence of a catalytic amount of an alkaline esterification catalyst. In addition a small amount of a lower alkanoic acid or acid anhydride may also be present during the esterification step. The alkaline esterification catalysts that may be used in this reaction are preferably alkali metal salts of acids having dissociation constants of less than $1.8 \times 10^{-4}$ at 25° C. These salts include the sodium, potassium, lithium, rubidium, and cesium salts of a wide variety of organic and inorganic acids. Illustrative of these salts are the following: sodium formate, sodium acetate, sodium propionate, sodium laurate, sodium stearate, sodium benzoate, sodium salicylate, sodium carbonate, disodium phosphate, lithium acetate, lithium benzoate, potassium formate, potassium acetate, potassium benzoate, potassium carbonate, and the like. The amount of the alkaline esterification catalyst that is used is not critical and ordinarily varies from approximately 0.001% to 1% based on the weight of the alkylene dicarboxylate. In most cases approximately 0.01% to 0.1% based on the weight of the alkylene dicarboxylate is used. Useful alkanoic acids and acid anhydrides include acetic acid, acetic anhydride, propionic acid, propionic anhydride, and butyric acid.

Following the esterification step, the stabilized polyoxymethylene, which precipitates when the reaction mixture is cooled to room temperature, is isolated by well-known procedures, such as filtration.

It has been found advantageous to wash and dry the stabilized polyoxymethylene as thoroughly as possible or otherwise treat it to remove all of the reactants and reaction by-products that might cause degradation of the product. This purification may be accomplished by washing the polymer with water and organic solvents, such as ketones, ethers, and hydrocarbons, and drying the recovered polymer under subatmospheric pressure or by other procedures known to those skilled in the art. It is not intended that this invention should be limited to any particular method of removing impurities from the product since any of several well-known procedures may be used to accomplish this. As has been indicated, the stabilized polyoxymethylene is ordinarily treated during or after washing with one of the aforementioned antioxidants.

The thermal stability of the esterified polyoxymethylene may be determined by measuring the weight loss that a one gram sample of the product undergoes on being heated at 222° C. for one hour. The stabilized polymers prepared in accordance with the process of this invention have a thermal degradation rate at this temperature of less than 20% per hour and preferably less than 15% per hour.

In addition to being valuable for the production of thermally-stable high molecular weight polyoxymethylene, the present procedure can also be used for the production of thermally-stable high molecular weight formaldehyde copolymers, and particularly of such copolymers that contain at least 60% and preferably 90% to 99.5% of oxymethylene units. These products may be obtained by polymerizing a mixture containing approximately 1 to 40 parts by weight of a copolymerizable material per 100 parts by weight of formaldehyde in the presence of one of the aforementioned metal salt initiators and the alkylidene diester and stabilizing the resulting copolymer. A wide variety of copolymerizable materials may be used in this process including, for example, alkylene oxides, lactones, glycols, glycol esters, cyclic ethers, acetals of polyhydric alcohols, aliphatic or aromatic aldehydes, and mixtures thereof. Illustrative of these materials are ethylene oxide, propylene oxide, butylene oxide, gamma-butyrolactone, phthalide, dioxolane, neopentyl glycol formals, ethylene glycol, ethylene glycol diacetate, pentaerythritol acetals, glycerol acetals, trimethylolethane acetals, sorbitol acetals, acetaldehyde, propionaldehyde, and the like. The conditions under which the copolymerization and stabilization of the copolymer are accomplished are similar to those set forth hereinbefore in connection with the preparation and stabilization of high molecular weight polyoxymethylene.

The following examples will illustrate the manner in which this invention may be practiced. It is to be understood, however, that these examples are not to be construed as being limitative, but are furnished merely for purposes of illustration.

EXAMPLE 1

A series of polymerization runs was made in which formaldehyde was polymerized in methylene diacetate in the presence of various polymerization initiators at temperatures ranging from approximately −20° C. to 45° C. The following procedure was used in these polymerizations:

A mixture of 560 grams of methylene diacetate, 0.1 gram of the polymerization initiator, and 0.1 gram of 4,4′-butylidene bis (3-methyl-6-tert. butylphenol) was heated in a reactor to distill off 157 grams of methylene diacetate and then cooled to the desired reaction temperature. To the reactor was then added anhydrous monomeric formaldehyde obtained by heating at 117°–150° C. a suspension of 100 grams of α-polyoxymethylene in 400 ml. of paraffin oil and passing the resulting vapors along with a stream of dry nitrogen through a series of traps, the first of which was maintained at room temperature, the second at 0° C., and the third and fourth at −20° C. to −25° C. The reaction mixture was stirred vigorously during the addition of the monomeric formaldehyde which took place over a period of 1 hour. Each reaction mixture was maintained within the temperature range specified in Table I during the addition of the formaldehyde. When all of the formaldehyde had been added, 0.4 gram of anhydrous sodium acetate was added to the reaction mixture. The mixture was then stirred and heated gradually to 160°–170° C., maintained at that temperature for 1 hour, cooled to room temperature, and filtered. The crude product was washed with 500 ml. of acetone, with three 500 ml. portions of water, and finally with two additional 500 ml. portions of acetone, the second of which contained 0.1 gram of 4,4′-butylidene bis (3-methyl-6-tert. butylphenol). The product was dried under vacuum at 65° C. to constant weight.

The inherent viscosity of each polymer was measured at 150° C. on a 0.5% solution of the polymer in dimethylformamide containing 1% by weight of diphenylamine.

The results of these runs are given in Table I.

*Table I*

| Polymerization Initiator | Temperature of Polymerization, °C. | Percent Conversion to Polyoxymethylene | Inherent Viscosity | Average Molecular Weight |
| --- | --- | --- | --- | --- |
| Iron Octanoate | −20 to −25 | 43.2 | 1.192 | 90,000 |
| | +20 to +25 | 41.7 | 1.038 | 70,000 |
| | +30 to +35 | 47.5 | 0.556 | 26,000 |
| | +40 to +45 | 40.0 | 0.982 | 64,000 |
| n-Tributylamine | −20 to −25 | 56.7 | 0.738 | 40,000 |
| | 0 to −5 | 47.9 | 0.326 | 11,000 |
| | 0 to +20 | 48.0 | 0.456 | 19,000 |
| | +20 to +25 | 31.1 | 0.372 | 13,000 |
| N,N′-Tetramethyl butanediamine | −20 to −25 | 50.2 | 0.770 | 44,000 |
| | +20 to +25 | 27.4 | 0.384 | 14,000 |
| Tri(dimethylamino) phenol | −20 to −25 | 49.7 | 0.856 | 52,000 |
| | +20 to +25 | 32.5 | 0.418 | 16,000 |

From the data in Table I it will be seen that only when iron octanoate was used as the polymerization initiator were good conversions of formaldehyde to polymers having molecular weights of at least 20,000 obtained at polymerization temperatures of 20° C. or higher.

EXAMPLE 2

A mixture of 560 grams of methylene diacetate, a solution containing approximately 0.05 gram of iron octanoate in 5 ml. of toluene, and 0.1 gram of 4,4′-butylidene bis (3-methyl-6-tert.butylphenol) was heated in a reactor to distill off 160 grams of methylene diacetate and then cooled to 10° C. To the reactor was then added anhydrous monomeric formaldehyde obtained by heating at 117° C.–150° C. a suspension of 100 grams of α-polyoxymethylene in 400 ml. of paraffin oil and passing the resulting vapors along with a stream of dry nitrogen through a trap at 1°–2° C. The reaction mixture was stirred vigorously during the addition of the monomeric formaldehyde which took place over a period of 1 hour. The reaction mixture was maintained at 10° C.–25° C. during the addition of the formaldehyde. When all of the formaldehyde had been added, 300 grams of methylene diacetate, 0.4 gram of anhydrous sodium acetate, and 10 grams of acetic anhydride were added to the reaction mixture. The mixture was then stirred and heated gradually to 160°–170° C., maintained at that temperature for 1 hour, cooled to room temperature, and filtered. The crude product was washed with 500 ml. of acetone, with three 500 ml. portions of water, and finally with two additional 500 ml. portions of acetone, the second of which contained 0.1 gram of 4,4'-butylidene bis(3-methyl-6-tert. butylphenol). The product after drying to constant weight under vacuum at 65° C. weighed 54.7 grams and had an average molecular weight of 70,000 and a thermal degradation rate at 222° C. of 10.1% per hour.

EXAMPLE 3

The polymerization of formaldehyde using iron octanoate as the polymerization initiator was carried out by the procedure described in Example 4. In this case, however, the polymerization was carried out at 50°–55° C. and 0.4 gram of iron octanoate was used. There was obtained a 55.5% conversion of the monomeric formaldehyde to polyoxymethylene which had an average molecular weight of 155,000 and a thermal degradation rate at 222° C. of 9.95% per hour.

EXAMPLE 4

To a mixture of 1000 grams of methylene diacetate, a solution containing 0.1 gram of iron octanoate in 5 ml. of toluene, 0.1 gram of 4,4'-butylidene bis(3-methyl-6-tert. butylphenol), 10 grams of acetic acid, and 10 grams of acetic anhydride was added anhydrous monomeric formaldehyde obtained from the pyrolysis of 100 grams of $\alpha$-polyoxymethylene. The reaction mixture was stirred vigorously during the addition of the monomeric formaldehyde which took place over a period of 1 hour. During the addition of the formaldehyde, the reaction mixture was maintained at 25°–35° C. When all of the formaldehyde had been added, 20 grams of acetic anhydride and 0.4 gram of anhydrous sodium acetate were added to the reaction mixture. The mixture was then stirred and heated gradually to 155°–160° C., maintained at that temperature for 1 hour, cooled to room temperature, and filtered. The crude product was washed with 500 ml. of acetone, with three 500 ml. portions of water, and finally with two additional 500 ml. portions of acetone, the second of which contained 0.1 gram of 4,4'-butylidene bis(3-methyl-6-tert. butylphenol). The product after drying to constant weight under vacuum at 65° C. had an average molecular weight of 29,000 and a thermal degradation rate of 222° C. of 1.0% per hour.

EXAMPLE 5

To a mixture of 1000 grams of methylene diacetate, 1.0 gram of acetic anhydride, a solution of 0.1 gram of iron octanoate in 5 ml. of toluene, and 0.1 gram of phenothiazine was added anhydrous monomeric formaldehyde obtained from the pyrolysis of 100 grams of $\alpha$-polyoxymethylene. The addition of formaldehyde took place over a period of 53 minutes during which time 5 ml. of methanol was added in 0.5 ml. portions. During the addition of the formaldehyde and methanol, the reaction temperature was maintained at 28°–36° C. When all of the formaldehyde had been added, 20 grams of acetic anhydride and 0.4 gram of anhydrous sodium formate were added to the reaction mixture. The mixture was then stirred and heated gradually to 165° C., maintained at that temperature for 1 hour, cooled to room temperature, and filtered. The crude product was washed with 500 ml. of acetone, with three 500 ml. portions of water, and then with two additional 500 ml. portions of acetone, the second of which contained 0.1 gram of phenothiazine. The product after drying to constant weight under vacuum at 65° C. had an average molecular weight of 59,000 and a thermal degradation rate at 222° C. of 5.49% per hour.

EXAMPLE 6

A series of runs was made in which polyvalent metal salts were used as the initiators in formaldehyde polymerization reactions. In each case anhydrous monomeric formaldehyde obtained from the pyrolysis of 100 grams of $\alpha$-polyoxymethylene was added to a mixture of 700 grams of methylene diacetate, 0.05 gram of the initiator in 5 ml. of toluene, 0.1 gram of 4,4'-butylidene bis(3-methyl-6-tert. butylphenol), and 3 grams of ethyl formate over a period of approximately 1 hour. When all of the formaldehyde had been added, 10 grams of acetic anhydride and 0.4 gram of sodium acetate were added to the reaction mixture. The mixture was then stirred and heated gradually to 150°–160° C., maintained at that temperature for 1 hour, cooled to room temperature, and filtered. The crude product was washed with 500 ml. of acetone, with three 500 ml. portions of water, and finally with two 500 ml. portions of acetone, the second of which contained 0.1 gram of 4,4'-butylidene bis(3-methyl-6-tert. butylphenol). Further details of these runs are given in Table II.

*Table II*

| Ex. No. | Polymerization Initiator | Polymerization Temperature (° C.) | Average Molecular Weight |
|---|---|---|---|
| 6A | Iron Octanoate | 26–28 | 32,000 |
| 6B | Zinc Octanoate | 27–33 | 20,000 |
| 6C | Calcium Octanoate | 30–35 | 11,500 |
| 6D | Lead Octanoate | 28–38 | 10,000 |
| 6E | Manganese Octanoate | 28–36 | 115,000 |
| 6F | Stannous Octanoate | 27–28 | 17,500 |

EXAMPLE 7

A mixture of 658 grams of methylene diacetate, 0.1 gram of 4,4'-butylidene bis(3-methyl-6-tert. butylphenol) and a solution of 0.1 gram of zirconium octanoate in 5 ml. of toluene was heated in a reactor to distill off 118 grams of methylene diacetate and then cooled to 15°–20° C. To this reactor was then added anhydrous monomeric formaldehyde obtained by heating at 120°–150° C. a suspension of 100 grams of $\alpha$-polyoxymethylene in 400 ml. of paraffin oil and passing the resulting vapors along with a stream of dry nitrogen through a series of traps, the first of which was maintained at room temperature, the second at 0° C., and the third and fourth at −20° C. to −25° C. The reaction mixture was stirred vigorously during the addition of the monomeric formaldehyde which took place over a period of 1 hour. During this period 3 grams of ethylene glycol and 1 gram of diethylene glycol were also added to the reaction mixture. The reaction mixture was maintained at a temperature of 10° C. to 18° C. during the addition of the formaldehyde and the glycols. At the end of the addition period, 0.5 gram of sodium propionate and 10 ml. of propionic anhydride were added to the reaction mixture. The mixture was then stirred and heated gradually to 160°–165° C., maintained at that temperature for 1 hour, cooled to room temperature, and filtered. The crude product was washed with 500 ml. of acetone, with three 500 ml. portions of water, and finally with two additional 500 ml. portions of acetone, the second of which contained 0.1 gram of 4,4'-butylidene bis (3-methyl-6-tert. butylphenol). The product after drying to constant weight under vacuum at 65° C. had an average molecular weight of 103,000 and a thermal degradation rate of 222° C. of 10% per hour. This copolymer contained approximately 99% of oxymethylene units and 1% of comonomer units.

EXAMPLE 8

A mixture of 668 grams of methylene diacetate, a solution of 0.1 gram of zirconium octanoate in 5 ml. of toluene, and 0.1 gram of 4,4'-butylidene bis (3-methyl-6-tert. butylphenol) was heated in a reactor to distill off 122 grams of methylene diacetate and then cooled to 10° C. To this reactor was then added anhydrous monomeric formaldehyde obtained by heating at 120°–150° C. a suspension of 100 grams of α-polyoxymethylene in 400 ml. of paraffin oil and passing the resulting vapors along with a stream of dry nitrogen through a series of traps, the first of which was maintained at room temperature, the second at 0° C., and the third and fourth at —20° C. to —25° C. The reaction mixture was stirred vigorously during the addition of the monomeric formaldehyde which took place over a period of 1 hour. During this period 3 grams of ethylene glycol diacetate was also added to the reaction mixture. The reaction mixture was maintained at a temperature of 10° C. to 17° C. during the addition of the formaldehyde and the ethylene glycol diacetate. At the end of the addition period, 0.5 gram of sodium acetate and 10 ml. of acetic anhydride were added to the reaction mixture. The mixture was then stirred and heated gradually to 168° C., maintained at that temperature for 1 hour, cooled to room temperature, and filtered. The crude product was washed with 500 ml. of acetone, with three 500 ml. portions of water, and finally with two additional 500 ml. portions of acetone, the second of which contained 0.1 gram of 4,4'-butylidene bis (3-methyl-6-tert. butylphenol). The resulting copolymer after drying to constant weight under vacuum at 65° C. had an average molecular weight of 120,000 and a thermal degradation rate at 222° C. of 10.7% per hour. It contained approximately 99% of oxymethylene units and 1% of comonomer units.

The stabilized high molecular weight polyoxymethylene compositions of the present invention may if desired contain plasticizers, fillers, pigments, solvents, antioxidants, and other stabilizers, such as stabilizers against degradation caused by ultraviolet light. They may also contain other polymeric materials, for example, urea-formaldehyde resins, phenol-formaldehyde resins, polyvinyl halide resins, and the like.

The polyoxymethylenes produced by the process of this invention have excellent thermal stability, are orientable by drawing, and are useful in many applications. They may be converted by melt extrusion, injection molding, compression molding, and other fabrication methods to films, fibers, molded articles, and the like.

What is claimed is:

1. In a process for the production of a high molecular weight polymer of formaldehyde, in which substantially anhydrous monomeric formaldehyde is polymerized in a reaction medium comprising an alkylene dicarboxylate having a structure represented by the formula

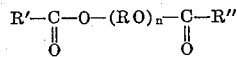

in which R represents a divalent radical selected from the group consisting of —CH$_2$— and —CH(CH$_3$)—, R' and R'' each represent a radical selected from the group consisting of alkyl groups containing from 1 to 18 carbon atoms, cycloalkyl groups, and aryl groups, and $n$ is an integer in the range from 1 to 3, the improvement which comprises dissolving in the alkylene dicarboxylate a catalytic amount of a formaldehyde polymerization initiator comprising a polyvalent metal salt of an alkanoic acid containing from 4 to 18 carbon atoms, and thereafter passing the monomeric formaldehyde through the reaction medium at a temperature in the range from about 10° C. to about 80° C., thereby forming a suspension of a high molecular weight polymer of formaldehyde in the reaction medium.

2. The process of claim 1, in which the alkylene dicarboxylate is methylene diacetate.

3. The process of claim 1, in which the polymerization reaction is conducted at a temperature in the range from about 20° C. to about 60° C.

4. The process of claim 1, in which the formaldehyde polymerization initiator is an iron salt of an alkanoic acid containing from 4 to 18 carbon atoms.

5. The process of claim 1, in which the formaldehyde polymerization initiator is iron octoate.

6. The process of claim 1, in which the formaldehyde polymerization initiator is a maganese salt of an alkanoic acid containing 4 to 18 carbon atoms.

7. The process of claim 1, in which the formaldehyde polymerization initiator is a stannous salt of an alkanoic acid containing 4 to 18 carbon atoms.

8. The process of claim 1, in which the formaldehyde polymerization initiator is a zinc salt of an alkanoic acid containing 4 to 18 carbon atoms.

9. The process of claim 1, in which the formaldehyde polymerization initiator is a zirconium salt of an alkanoic acid containing 4 to 18 carbon atoms.

10. The process for producing a thermally-stable high molecular weight polymer of formaldehyde which comprises (a) passing substantially anhydrous monomeric formaldehyde into a reaction medium comprising methylene diacetate in which there is dissolved a catalytic amount of a polyvalent metal salt of an alkanoic acid containing 4 to 18 carbon atoms while maintaining the reaction medium at a temperature in the range from about 10° C. to about 80° C., thereby forming a suspension within the reaction medium of a high molecular weight polymer of formaldehyde, (b) heating the suspension in the reaction medium to a temperature in the range from about 140° C. to about 200° C. to thermally stabilize the high molecular weight polymer of formaldehyde, and (c) recovering the resultant thermally-stable, high molecular weight polymer of formaldehyde from the reaction medium.

11. The process of claim 10, in which the formaldehyde polymerization initiator is an iron salt of an alkanoic acid containing 4 to 18 carbon atoms, and the polymerization reaction is conducted at a temperature in the range from about 20° C. to about 60° C.

References Cited by the Examiner

UNITED STATES PATENTS

| | | | |
|---|---|---|---|
| 2,312,193 | 2/43 | Richter | 260—83 |
| 2,519,550 | 8/50 | Craven | 260—67 |
| 2,934,505 | 4/60 | Gurgiolo | 260—2 |
| 2,964,500 | 12/60 | Jenkins et al. | 260—67 |
| 2,998,409 | 8/61 | Nogare et al. | 260—67 |
| 3,000,860 | 9/61 | Brown et al. | 260—67 |
| 3,005,799 | 10/61 | Wagner | 260—67 |
| 3,017,389 | 1/62 | Langsdorf et al. | 260—67 |
| 3,046,521 | 7/62 | Wagner | 260—67 |

WILLIAM H. SHORT, *Primary Examiner.*

UNITED STATES PATENT OFFICE
CERTIFICATE OF CORRECTION

Patent No. 3,193,532　　　　　　　　　　　　　　　　July 6, 1965

Henri Sidi

It is hereby certified that error appears in the above numbered patent requiring correction and that the said Letters Patent should read as corrected below.

Column 1, line 50 and lines 71 and 72, column 4, line 53, and column 5, line 56, for "alkylidene diester", each occurrence, read -- alkylene dicarboxylate --; column 3, line 5, for "alkyline" read -- alkylene --; line 37, for "omtanoate" read -- octanoate --; column 4, line 58, for "with" read -- the --; column 5, line 53, for "wegiht" read -- weight --; column 8, Table II, third column, line 1 thereof, for "26-28" read -- 26-38 --; same Table II, third column, line 6 thereof, for "27-28" read -- 27-38 --.

Signed and sealed this 7th day of December 1965.

(SEAL)
Attest:

ERNEST W. SWIDER　　　　　　　　　　　　　　　EDWARD J. BRENNER
Attesting Officer　　　　　　　　　　　　　　　　Commissioner of Patents